Patented Sept. 10, 1929.

1,727,682

UNITED STATES PATENT OFFICE.

EDUARD TSCHUNKUR, OF COLOGNE, MULHEIM, AND FRITZ EICHLER, OF LEVERKUSEN-ON-THE-RHINE, GERMANY, ASSIGNORS TO GENERAL ANILINE WORKS, INC., OF NEW YORK, N. Y., A CORPORATION OF DELAWARE.

PROCESS FOR THE MANUFACTURE OF XYLENES.

No Drawing. Application filed September 15, 1927, Serial No. 219,803, and in Germany August 10, 1926.

This invention relates to a process for the manufacture of o- and p-xylene.

Technical xylene, which is obtained together with benzene and toluene by the coking of coal, consists mainly of m-xylene, with a small quantity of o- and p-xylene, besides these ethylbenzene, trimethyl benzene and higher homologues, fatty acid hydrocarbons and other impurities, the nature of which is not fully established, are also present. Thus there is an abundant supply of m-xylene, but not of o- and p-xylene whose production has hitherto been attended with considerable difficulties. The isolation of the small quantity of o- and p-xylene from technical xylene is rendered difficult by the numerous impurities present, and in fact the purification and subsequent isolation of o- and p-xylene is rendered commercially impracticable.

According to the present invention o- and p-xylene are manufactured by treating toluene with formaldehyde (or substances yielding formaldehyde) in the presence of hydrochloric acid. A condensing agent such as zinc chloride, tin chloride, aluminium chloride, iron chloride or the like may be present. By this process a good yield of o- and p-xylyl chloride in approximately equal proportions is obtained, which may be converted by chemical electrolytic or catalytic reduction with hydrogen into the corresponding o- and p-xylene.

The separation and purification of the p- and o-xylene may be readily effected by fractional distillation.

The separation of o-xylene from p-xylene can also be effected by sulfonation, since o-xylene is much more readily sulfonated than p-xylene.

The present invention accordingly provides a new process for the manufacture of o- and p-xylene in any quantity, which is both technically convenient and economical, whereas hitherto these compounds could only be obtained in limited quantities and with great difficulty and expense.

The following examples will illustrate the invention:

*Example 1.*—368 kilograms of toluene, 200 litres of hydrochloric acid and 60 kilograms of paraformaldehyde (which may be replaced by the corresponding quantity of 40% farmaldehyde) are heated to about 60° C. in a lead lined or acid proof vessel and a vigorous current of hydrochloric acid gas is passed through under vigorous stirring. The reaction is complete after about 36 to 40 hours (the end of the reaction is ascertained by testing for the presence of formaldehyde in the acid liquor). When the reaction is complete the upper layer containing toluene and o- and p-xylyl chloride is separated from the hydrochloric acid layer and converted by reduction into a mixture of toluene and o- and p-xylene as above indicated. The resulting mixture can be separated from the toluene by fractional distillation and o-xylene and p-xylene obtained of a satisfactory purity.

As already stated (after the distillation of toluene) the o-xylene can be separated and obtained pure from p-xylene by sulfonation and subsequent hydrolyzing of the sulfonic acids produced.

*Example 2.*—Into a mixture of 800 kilograms of toluene, 60 kilograms of paraformaldehyde and 30 kilograms of zinc chloride or stannic tetrachloride $SnCl_4$ a current of HCl is introduced at 60° C. When the HCl gas is no longer absorbed a solution of sodium carbonate is added and from the aqueous layer which is separated ortho- and para-xylene are isolated as stated in Example 1.

We claim:

1. In the process for the manufacture of o- and p-xylenes, the steps comprising treating toluene with formaldehyde in the presence of hydrochloric acid and reducing the resulting mixture of o- and p-xylyl chlorides to the corresponding xylenes.

2. Process for the manufacture of xylenes as claimed in claim 1, in which the condensation treatment is effected in the presence of a condensing agent.

In testimony whereof we have hereunto set our hands.

EDUARD TSCHUNKUR.
FRITZ EICHLER.